United States Patent [19]

Hardman et al.

[11] 4,407,154
[45] Oct. 4, 1983

[54] BOWLING BALL WEIGHING AND BALANCING DEVICE

[76] Inventors: Charles A. Hardman, 3326 W. 8th St.; Orville M. Burns, Jr., R.R. 4, both of Lawrence, Kans. 66044

[21] Appl. No.: 301,478

[22] Filed: Sep. 14, 1981

[51] Int. Cl.³ .................. G01M 1/04; G01M 1/12
[52] U.S. Cl. ................................. 73/66; 73/480; 73/482
[58] Field of Search .............. 73/65, 66, 480, 482, 73/483, 487

[56] References Cited

U.S. PATENT DOCUMENTS

| | | | |
|---|---|---|---|
| 1,099,917 | 6/1914 | Dungan et al. | 73/482 |
| 2,782,631 | 2/1957 | Baltrukonis et al. | 73/65 |
| 3,029,521 | 4/1962 | Estopare . | |
| 3,143,901 | 8/1964 | Bawtinheimer . | |
| 3,156,067 | 11/1964 | Malko | 73/483 |
| 3,161,041 | 12/1964 | Amburgey | 73/65 |
| 3,465,619 | 9/1969 | Blaker et al. . | |
| 3,486,244 | 12/1969 | Horn . | |

*Primary Examiner*—James J. Gill
*Attorney, Agent, or Firm*—Litman, Day & McMahon

[57] ABSTRACT

A bowling ball weighing device is provided for determining weight imbalance between various opposed sides of bowling balls comprising a support stand having two substantially vertically oriented standards supporting a circular cradle freely and pivotally therebetween for free rotation of the cradle about an axis of rotation extending between the standards. The cradle is adapted to receive a bowling ball therein, with the geometric center of a bowling ball lying in a vertical plane which includes the cradle axis of rotation and which divides the ball into opposed sides. An elongate indicator is securely attached to the cradle and registers on an indicia carrying field attached to the support stand the degree of weight imbalance between the opposed sides of the bowling ball.

11 Claims, 11 Drawing Figures

BOWLING BALL WEIGHING AND BALANCING DEVICE

BACKGROUND OF THE INVENTION

This invention relates generally to object weighing devices and in particular, to a weighing device for determining weight imbalance in a bowling ball.

Bowling not only is a favorite pastime, but is also a competitive professional sport having numerous tournaments nationwide. In order to assure that the individual competitors do not gain an unjust advantage over one another, certain rules have been promulgated relating to the balance of the weight of bowling balls used in such tournaments.

By way of information, a bowling ball is defined as having six different halves or sides, with the sides being those opposed to the three orthogonal planes intersecting at a geometric center of the ball. The orientation of the planes is such that a first plane bisects the ball into a top and bottom half with the top half being that portion of the bowling ball which includes the finger and thumb holes. A second plane defines two sides of the ball, the left and right, with the second plane extending through the geometric center of the ball, the thumb hole and a point midway between the finger holes of the bowling ball. The third orthogonal plane would be perpendicular to both of the prior planes and positioned so as to cut the bowling ball surface intermediately between the thumb and the finger holes defining a finger hole side and a thumb hole side thereof.

As mentioned, rules have been promulgated to limit the imbalance between sides of the bowling ball specifically the difference in weight between the top and bottom halves, right and left side, and finger side and thumb side.

At a bowling tournament each bowling ball must be weighed to determine whether it conforms to the rules. Prior art examples of such weighing devices have included an arm resting near a central portion thereof on a fulcrum and having at one end thereof a cradle in which to receive a bowling ball and at the other end thereof a combination of movable weights and scales. When a bowling ball is weighed by such a device, six different weights must be taken with the two weights that measure related sides of the bowling ball being compared to determine whether or not the bowling ball conforms to the stated rules. Such scales are cumbersome to operate which, along with the quantity of weight measurements required, mandates that a considerable amount of time be spent by tournament officials in weighing all the bowling balls to be used in the tournament.

Further, in the bowling industry, it is desirable for a seller of bowling balls to be able to tailor the weight imbalance of the bowling ball between the opposed sides according to an individual's desires while assuring that the weight imbalance is still within the accepted limits. This is desirable because, by altering the weight balance between two opposing sides of the bowling ball, the path of the bowling ball as it moves down a bowling lane can be altered. In particular, a bowling ball can be given what is known as positive side weight, that is that side of the bowling ball which initially is exposed inwardly of the bowling lane weighs more than the side of the bowling ball which is initially exposed to a gutter of the bowling lane. For example, the left side of a bowling ball used by righthanded individuals would weigh more than the right side of the ball when looking at the bowling ball when it is released by the bowler from the vantage point of the bowler.

When a bowling ball has positive side weight, the tendency of the ball as it progresses down the lane is to hook or bend toward the center of the bowling pin arrangement slower than a bowling ball with neutral side weight, but will finish or curve inwardly to the center more rapidly as it approaches the pins. This is an important aspect for some bowlers who normally throw a weak finishing ball without positive side weight because they have a tendency to leave standing the pin which is situated in the middle of the bowling pin pattern, the five pin. Further, negative side weight can be affixed to the bowling ball which would mean that the side of the bowling ball initially adjacent the gutter would weigh more than the side of the bowling ball initially adjacent the inner portion of the lane. Bowlers who have a tendency to curve or hook a ball too much would use a negative side weight distribution to retard the curving of the bowling ball as it approaches the pins.

Prior art weighing scales have been used to selectively provide the desired weight imbalance between the associated sides of a bowling ball but have been extremely difficult and time consuming to use in that regard.

OBJECTS OF THE INVENTION

Therefore, the objects of the present invention are: to provide a bowling ball weighing device comprising a support stand having two substantially vertically oriented standards pivotally supporting a cradle therebetween and indicator means associated with the cradle to indicate the weight imbalance of a bowling ball held therein; to further provide for such a device a cradle which retains a bowling ball therein in an orientation such that a vertical plane passing through the geometric center of the bowling ball passes through the point of support of the cradle on the support stand; to provide such a device which further includes a marker securely attached to the cradle and rotatable therewith which registers on a scale attached to the standard the degree of weight imbalance between opposing sides of the bowling ball; to provide on the standard of such a device a marking member which lies in a vertical plane which passes through the pivot points of the cradle to mark on a surface of a bowling ball held therein intersecting lines for determining the surface center of the bowling ball; to further provide a method for determining the degree of weight imbalance of a bowling ball by using such a device; to further provide such a method which will also allow a user of a bowling ball to drill finger holes in the bowling ball at a certain surface position thereon to achieve a desired weight imbalance between various sides of the bowling ball; and to provide such a device which is easy and simple to operate, capable of rapidly weighing bowling balls, durable in use, easy to manufacture and particularly well adapted for the intended usage thereof.

Other objects of this invention will become apparent from the following description taken in connection with the accompanying drawings wherein are set forth, by way of illustration and example, certain embodiments of this invention.

SUMMARY OF THE INVENTION

A bowling ball weighing device is provided comprising a support stand having two opposed substantially vertical standards pivotally holding on knife edges a circular cradle therebetween in which is received a bowling ball. The center of gravity of the cradle, geometric center of the bowling ball and the line about which the cradle pivots relative to the support stand all lie in a common vertical plane. An elongate indicator is securely attached to the cradle at a point coincident with the axis of rotation of the cradle which indicator indicates on a field affixed to the support stand the degree of weight imbalance in the bowling ball of opposed sides relative to the aforementioned vertical plane.

The bowling ball weighing device can be used to rapidly determine whether or not a specimen bowling ball conforms to regulations established limiting the weight imbalance between the opposed sides of the bowling ball. Further, the bowling ball weighing device can be used to determine where a center of a drilling pattern of finger holes should be positioned on the surface of the bowling ball to provide a desired weight imbalance of the bowling ball.

The drawings constitute a part of this specification and include exemplary embodiments of the present invention and illustrate various objects and features thereof.

DESCRIPTION OF THE PREFERRED EMBODIMENT

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figures 8, 9, 10, 11:
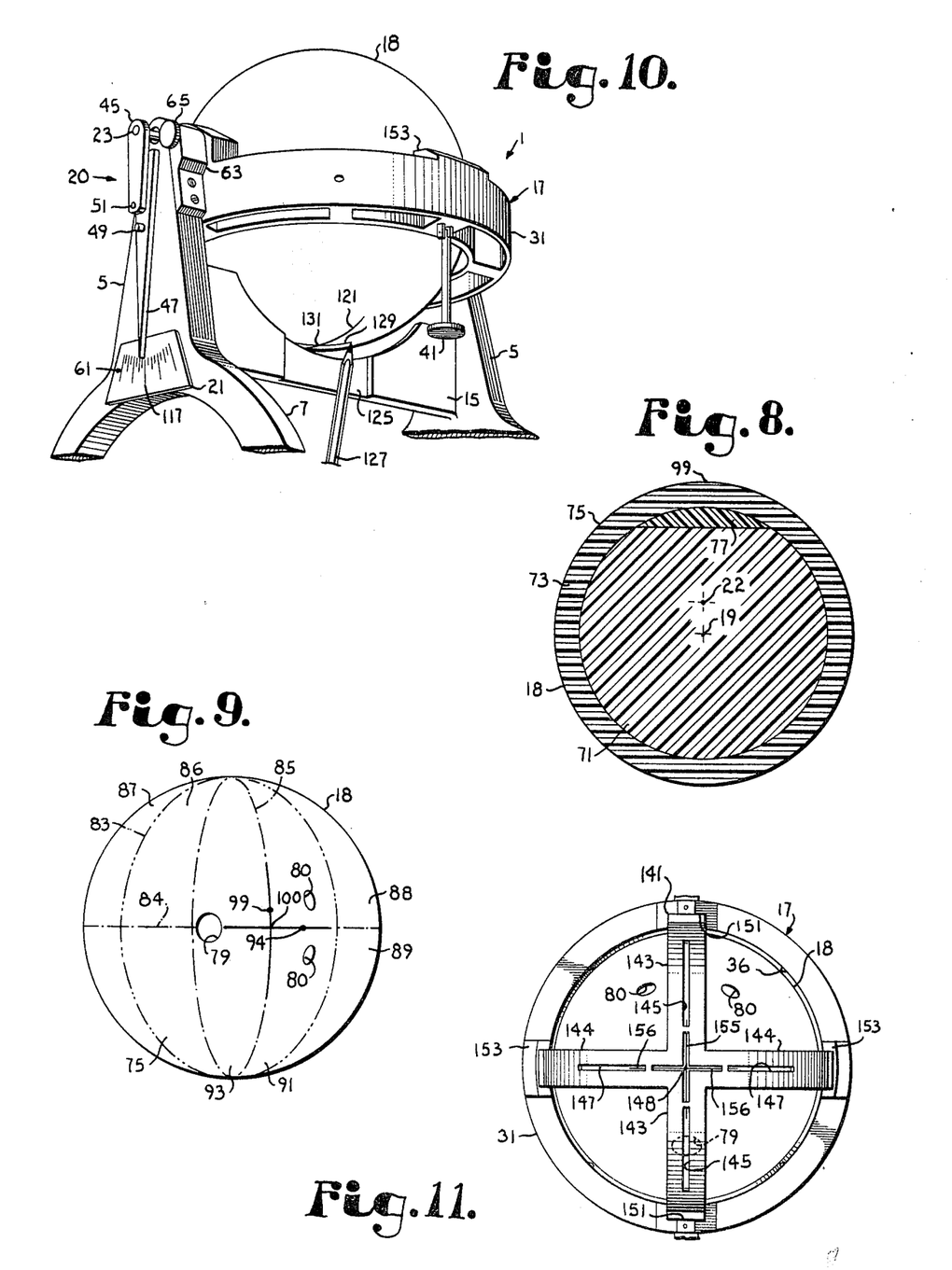
FIG. 8 is a cross-sectional view of a bowling ball.
FIG. 9 is a schematic representation of a bowling ball showing six sides thereof.
FIG. 10 is a perspective view of the bowling ball weighing device with a bowling ball therein showing a step in a method of ascertaining on a surface of the bowling ball a point which lies on a line through the geometric center and center of gravity of the bowling ball.
FIG. 11 is a top elevational view of the bowling ball weighing device showing an attachment thereto.

The reference numeral 1 generally designates a bowling ball weighing device according to the present invention. The bowling ball weighing device comprises a support stand 3 having two substantially vertical side standards 5 each standard terminating in leg members 7. Braces 11 extend between the leg members 7 near lower portions 9 thereof and include, received in threaded bores 13 therein, screws 12 which include feet 14 thereon which feet support the device 1 on a suitable surface 16. Near a central portion of the standards 5, extends therebetween a crossbrace 15. A cradle 17 is freely and rotatably held between the two standards 5 and supports therein a bowling ball 18 which has a geometric center 19 and a center of gravity 22 which typically are not coincident but are spaced apart a small distance as shown in FIG. 8 exaggerated for convenience. An indicator means 20 is associated with the cradle to indicate on a field 21 which is situated on one of the standards 5 the amount of weight imbalance of the bowling ball 18.

Figure 4:
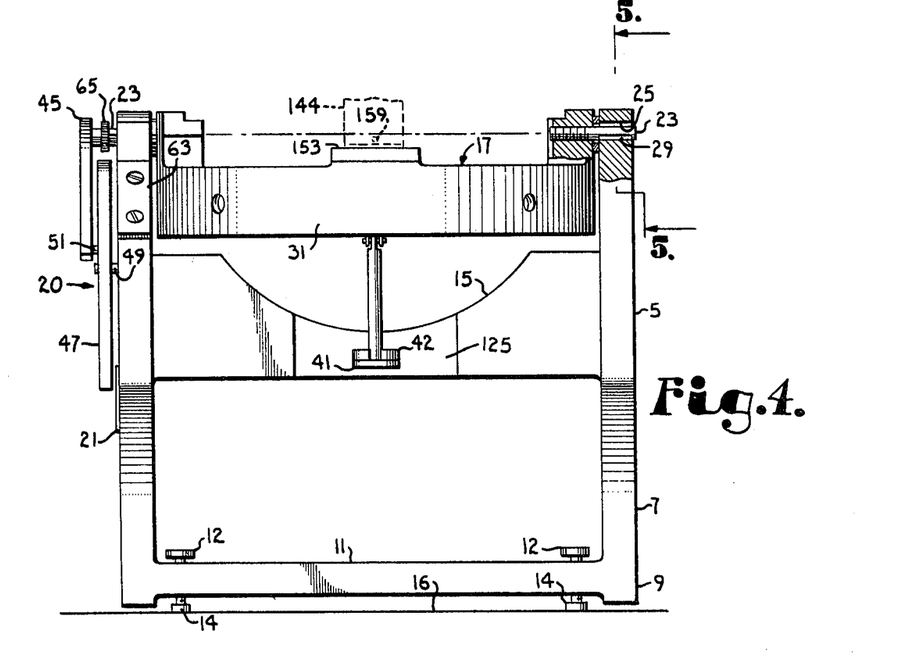
FIG. 4 is a side elevational view of the bowling ball weighing device with portions broken away to show details thereof.
Figure 5:
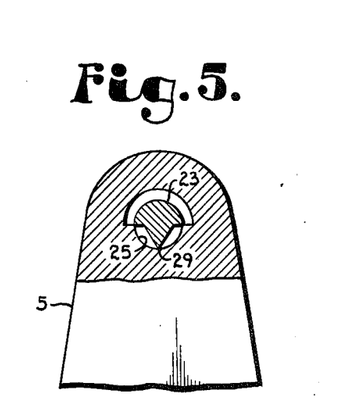
FIG. 5 is an enlarged fragmentary cross-sectional view of the bowling ball weighing device taken generally along line 5—5 in FIG. 4.
Figure 6:
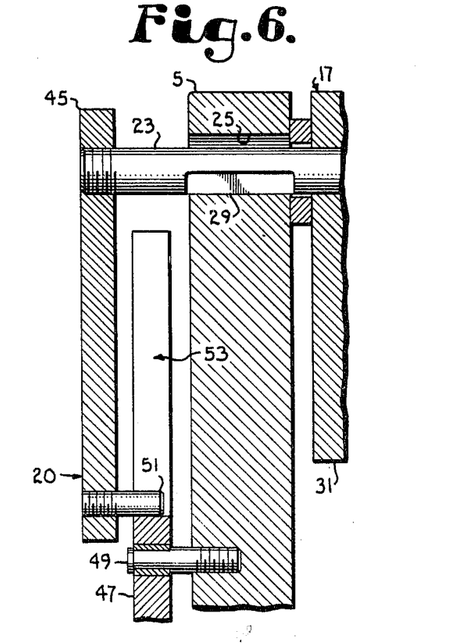
FIG. 6 is an enlarged cross-sectional view of the bowling ball weighing device taken generally along line 6—6 in FIG. 3.

As best shown in FIGS. 4 and 6, the cradle 17 includes extending outwardly at circumferentially opposed positions thereof, axles or shafts 23 which extend through bores 25 in the standards 5. The cradle shafts 23 include, near a middle portion thereof, a knife edge 29, FIG. 5, which engages a surface of the standard bores 25 and supports the cradle 17 on the support stand 3 so as to allow the cradle to freely pivot about a plurality of positions relative thereto about an axis of rotation through the knife edges 29. The axis of rotation of the cradle 17 relative to the support stand 3 is horizontal and the knife edges 29 preferably lie in a vertical plane passing through the center of gravity of the cradle 17 when the cradle 17 is in a first position thereof. Further, it is preferable that the moment of inertia between sides of the cradle 17 opposed to the just mentioned vertical plane is substantially the same to provide balance. It is seen that the cradle 17 does not move laterally relative to the standards 5 but only rotates about the axis of rotation therewith.

The cradle 17 further comprises a circular member 31 having a beveled inner surface 33 which includes spaced circumferentially therearound roller bearings 36 upon which the bowling ball 18 rests when placed within the cradle 17 which bearings 36 allow the ball 18 to be rotated therein easily. It is seen that the cradle 17 is substantially symmetrical about a vertical plane including the axis of rotation thereof through the knife edges 29. Preferably, when the ball 18 is placed in the cradle 17 with the cradle 17 in the first position thereof, a geometric center 19 of the ball 18 lies in the vertical plane passing through the center of gravity of the cradle and the knife edges 29. Further, the ball geometric center 19 and center of gravity 22 preferably lie below the cradle axis of rotation for stability.

Weight supports 41 which selectively support weights 42 thereon are provided on the cradle 17 at points equally spaced from and opposed to the axis of rotation of the cradle. Preferably, the weight supports 41 are spaced transversely from the axis of rotation of the cradle a distance equal to the radius of the bowling ball 18 and are pivotal relative to the support stand such that the supports 41 remain vertical when the cradle 17 rotates relative to stand 3. The weights 42 are selected from a set of weights, the function of which will be explained presently.

The indicator means 20 comprises a lever arm 45 which is securely and non-rotatably attached to one of the cradle shafts 23 and extends generally downwardly therefrom. The lever arm 45 engages a marker 47 which is pivotally attached near a medial portion thereof by means of pin 49 to one of the support stand standards 5. A pin 51 extends from lever arm 45 and is received within a slot 53 in an upper portion of marker 47. The marker 47 further includes at a lower extremity thereof a point 59 which registers with associated indicia 61 on field 21.

Figure 1:
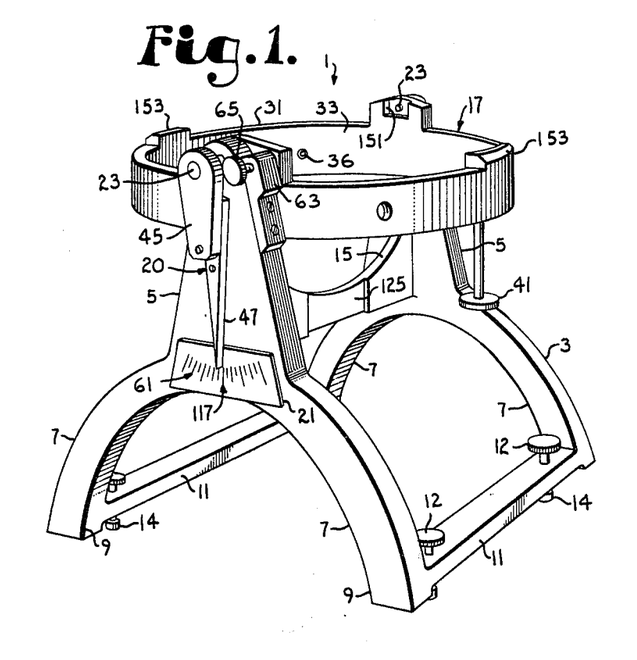
FIG. 1 is a perspective view of a bowling ball weighing device according to the present invention.
Figure 2:
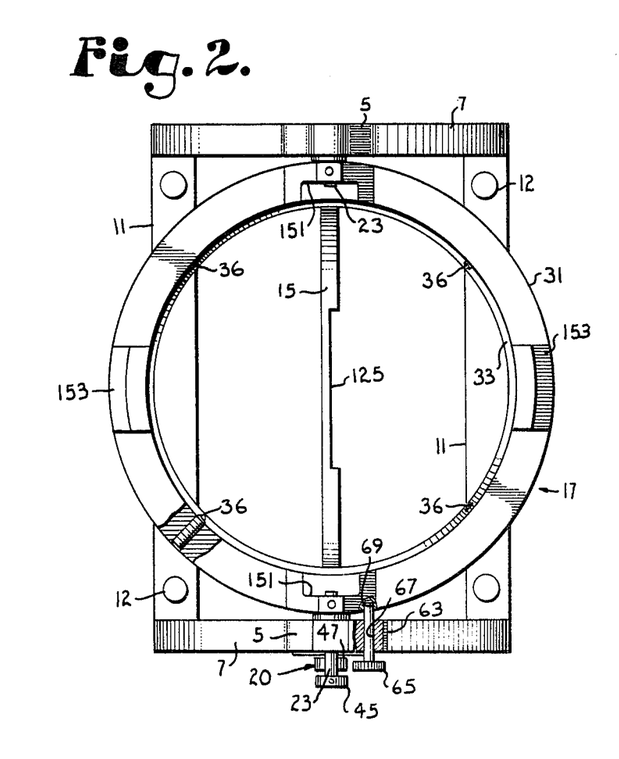
FIG. 2 is a top view of the bowling ball weighing device.

A lock mechanism 63 as shown in FIG. 2, is provided with one of the standards 5 to secure the cradle 17 from pivotal movement relative to the support stand 3 and comprises a pin 65 which selectively reciprocates within a bore 67 in lock 63 and is engageable with an associated bore 69 and cradle 17 to securely lock the cradle relative to the support stand 3.

The bowling ball 18 as shown in FIG. 8, comprises an inner core 71 of a suitably dense plastic material, and an outer layer 73 which is fabricated of a less dense material, generally plastic, and which forms the outer rolling surface 75 of the bowling ball 18. Further included in a typical bowling ball 18 is a weight 77 made of a material which is more dense than that of the outer portion 73 or inner core 71 and which is positioned between the inner core 71 and outer portion 73. Generally, the weight 77 weighs approximately five ounces greater than the inner core which it has displaced and is generally symmetrical about a radius extending from the geometric center 19 through the center of gravity 22. The weight 77 is provided for the reason that, when a bowling ball not having such a weight has finger holes 80 and a thumb hole 79 drilled thereinto, the ball 18 becomes significantly out of balance. Because of this, the weight 77 is placed in the bowling ball and the finger holes 80 and thumb hole 79 are drilled thereinto at a position on the bowling ball surface 75 adjacent the weight 77. Because of the inclusion of the weight therein the center of gravity 22 of the an individual bowling ball 18 would generally be displaced from the geometric center 19 thereof but not as much as if the weight 77 were not included therein.

A radius extending from the bowling ball geometric center 19 through the center of gravity 22 intersects the bowling ball surface 75 at a point 99 thereon designated as the surface center. The surface center 99 is used as an alignment point for determining the position on the bowling ball surface 75 for drilling the finger and thumb holes 80 and 79 respectively. Generally, for a bowling ball having no weight imbalance, the drilling pattern of the finger and thumb holes 80 and 79 is such that the holes are equally spaced around the surface center 99 as shown in FIG. 9. If weight imbalance is desired, the drilling pattern of the finger and thumb holes is generally equally spaced about a drilling pattern center 100 which is necessarily displaced from the surface center 99. Further, in a drilled ball, the drilling pattern center 100 is used to define six different sides or three pairs of opposed sides or hemispheres of the bowling ball. It is noted the drilling pattern center 100 is coincident with the bowling ball surface center 99 for balls with neutral weight imbalance.

Each of the three pairs of associated hemispheres are situated on opposite sides of three orthogonal planes which intersect at the ball geometric center 19. The planes are oriented to the bowling ball 18 such that a line of intersection of two of the planes also intersects the bowling ball surface 75 at the drilling pattern point 100. These two planes further intersect the bowling ball surface 75 at lines 84 and 85. It is seen in FIG. 9 that line 84 extends through the drilling pattern center 100, shown in FIG. 9 as being displaced from the surface center 99, the thumb hole 79 and a point 94 which is generally midway between the two finger holes 80. Line 84 dissects the bowling ball into two halves or sides known as the left side 88 and the right side 89. Line 85 divides the ball between a finger hole half 91 and a thumb hole half 93. The third orthogonal plane intersects the ball surface 75 at a line 83 which divides the ball 18 into a top half 86 which includes the finger and thumb holes 80 and 79 and the bottom half 87 which is opposed thereto. It is noted that ball 18 shown in FIG. 9 would have a weight imbalance with the left side 88 weighing more than the right side 89.

As noted, regulations have been promulgated which limit the weight imbalance between the associated opposed sides of the bowling ball, in particular, the top and bottom halves, 86 and 87, the left and right sides 88 and 89 and the finger and thumb halves, 91 and 93.

Figure 3:
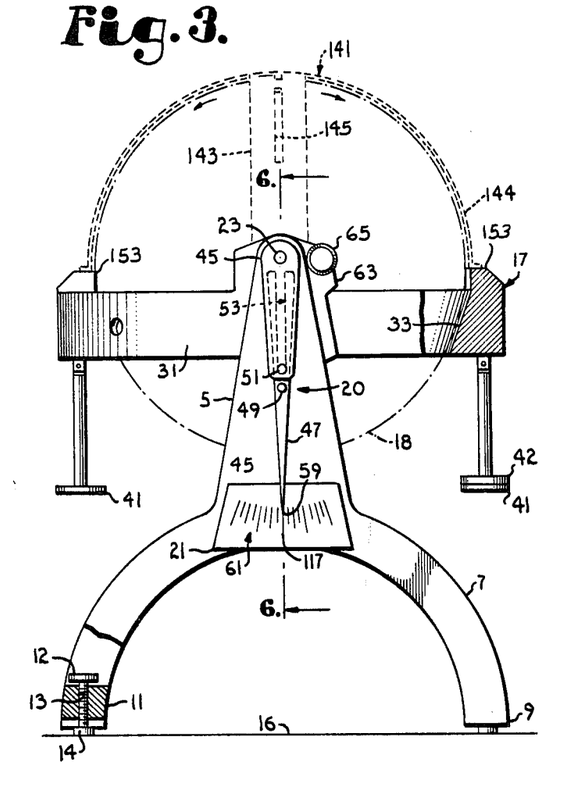
FIG. 3 is a front elevational view of the bowling ball weighing device with portions broken away to show details therefore and showing in phantom a bowling ball retained therein.

Prior to determining the surface center 99 of an undrilled bowling ball 18, it is necessary for a user of the device 1 to assure that the center of gravity of the cradle 17 is lying in a reference plane which reference plane is a vertical plane extending between the two knife edges 29. To do so, a user adjusts screws 12 such that the indicator marker point 59 registers with a middle zeroing indicia 117 as shown in FIG. 3. When this occurs the center of gravity of the cradle 17 lies in the reference plane.

In determining the surface center 99 of an undrilled bowling ball 18, a user places such an undrilled bowling ball into the weighing device 1 with that portion of the bowling ball which included the weight 77 being positioned downwardly. It is noted that the position of the weight is usually indicated by lettering (not shown) on the bowling ball surface 75 which indicates such information as the manufacturer of the bowling ball or the like. The user then rotates the ball 18 in a manner as shown by arrows in FIG. 3 about a horizontal axis of rotation parallel to the axis of rotation of the cradle 17 until the marker point 59 again registers on the zero indicia mark 117. When the bowling ball 18 is thusly positioned, this indicates that the bowling ball center of gravity 22 lies in the aforementioned reference plane. To indicate this position, the user draws a first line 121 on the ball surface 75, which line also lies in the reference plane. As seen in FIG. 2, the stand cross brace 15 includes thereon an indented portion 125 which is a surface coplanar with the reference plane. The user takes a suitable marker such as soft pencil 127 or the like, and draws line 121 on the bowling ball surface by running the edge of the pencil along the indented portion 125. It is noted that the lock mechanism 63 can be activated at this time to assure that the cradle 17 does not rotate with respect to the support stand 3 when drawing such lines. After making such a line, the user would rotate the bowling ball 18 about a substantially vertical axis extending through the ball geometric center 19 to a position as shown in FIG. 10 such that line 121 previously drawn is now oblique to the cross brace indented portion 125. Preferably, the user of the device rotates the ball approximately 90 degrees. At this time, the user again rotates the bowling ball about a substantially horizontal axis parallel to the cradle axis of rotation as shown by arrows in FIG. 3, to a position in the cradle where the marker point 59 again is in registry with the zero indicia 117. When this occurs, the center of gravity of the bowling ball again lies in the reference plane. The user then draws a second line 129 by marker 127 on the lower surface of the bowling ball as before as shown in FIG. 10. Preferably, the two lines 121 and 129 which are drawn on the surface of the bowling ball intersect at a point 131. This point 131 indicates the surface center 99 of the bowling ball or that point on the surface which, when a radius is drawn from that point to the geometric center 19, includes the center of gravity 22 of the bowling ball. As noted, the surface center 99 is used to aid in aligning a finger hole drilling pattern on the surface of the bowling ball. As such, the surface center 99 is usually indicated by a pin prick or other noticeable indentation on the ball surface.

In weighing a bowling ball 18 to determine the degree of imbalance between the various sides as aforementioned, it is preferable to use an attachment 141 which is placed over and supported by the cradle 17. The attachment 141 includes two sets of legs 143 and 144 which are perpendicular to each other. The attachment 141 further includes slits 145 and 147 in associated legs 143 and 144 respectively which intersect at an uppermost point 148 thereof. Slit 145 preferably lies in the vertical reference plane extending through knife edges 29. The attachment 141 is placed on the cradle 17 with two of the legs resting in indentations 151 which are formed in the cradle adjacent the cradle axles 23 and with the other two of the legs resting on protrusions 153 which extend upwardly from the cradle 17 at points spaced 90 degrees from the indentations 151.

In delineating the opposed sides of a drilled bowling ball, a user positions the bowling ball 18 in the cradle 17 with the drilling pattern center 100 extending upwardly. The user then places the attachment 141 over the bowling ball 18 and rotates the bowling ball 18 to where the drilling pattern center 100 is placed in substantial registry with the attachment intersection point 148. The user then rotates the bowling ball about a vertical axis through the surface center 99 to a position where the thumb hole 79 lies in registry with slit 145 as shown in FIG. 11, which slit lies in the reference plane and extends between the two cradle indentations 151. The user then marks on the bowling ball 18 by means of a suitable marker which is placed through slits 145 and 147 a line 155 between the two indentions 151 and another, 156, between the two protrusions 153 as shown in FIG. 11. When this is done, this delineates the left and right sides 88 and 89 of the bowling ball 18 and the finger half and thumb half 91 and 93.

Figure 7:
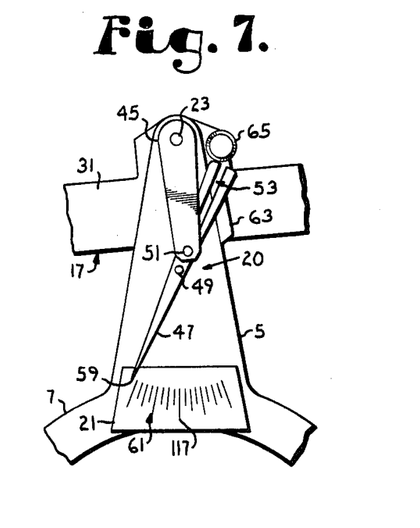
FIG. 7 is an enlarged fragmentary side view of the bowling ball weighing device showing a portion of the support stand, a cradle thereof and a marker indicator.

When the bowling ball 18 is in this position, and if the bowling ball is not perfectly balanced about the reference plane, the cradle 17 will tilt in one direction as shown in FIG. 7 with the pointer tip 59 pointing to that side of the bowling ball which is the heavier. In particular, as shown in FIG. 7, when the cradle 17 tilts counterclockwise, meaning that the left hand side of the bowling ball weighs more than the right hand side of the bowling ball when viewed straight on as in FIG. 3, then the indicator or marker 47 would pivot about pin 51 with the point 59 being biased toward the left. By reading from the field 21 that indicia 61 which is in registry with point 59 the user of the device 1 can readily ascertain to what degree the two sides of the bowling ball are in imbalance. A predetermined schedule can be provided either on the field 21 or apart from the device 1 to ascertain the degree of weight imbalance between the two sides from a given degree of rotation of the cradle 17, as indicated by the positioning of point 59 relative to field 21.

After the user has done this, he would rotate the bowling ball 18 about a vertical axis through the drilling pattern center 100 until line 156 is aligned between the two knife edges. When the ball 18 is in this position, the device 1 can be used to determine the weight imbalance between the finger half 91 of the bowling ball and the thumb half 93 of the bowling ball 18 in the manner set out before. After this has occurred, the user of the device then rotates the bowling ball about a horizontal axis parallel to the line extending between knife edges 29 ninety degrees such that the drilling pattern center 99 is placed in registry with a marker 159, FIG. 4 which is indicated on one of the attachment legs 144, as shown in FIG. 4. When the bowling ball is in this position with the finger holes and thumb hole to one side, the vertical reference plane divides the ball between the top half and bottom halves 86 and 87. The user can then determine the degree of weight imbalance between the top and bottom halves by using the aforementioned method.

An alternate method to be used in determining whether or not the weight imbalance of a bowling ball between various associated sides is within proscribed standards is described as follows. The user would place the bowling ball 18 in the position as previously set forth wherein the user is determining the side-to-side weight imbalance. The user then places a weight 42 which corresponds to that degree of imbalance which is acceptable on one of the weight supports 41 which is on the side of the bowling ball which weighs less. If, after doing so, the marker point 59 points toward the zero centering point 117, as shown in FIG. 3, or to that side of the cradle upon which the weight was placed, then the weight imbalance of the bowling ball is within proscribed standards. This can be repeated for both the finger and thumb halves and the top and bottom halves keeping in mind that the weight 42 positioned on the weight support 41 must conform with the allowable weight imbalance between the various associated halves. It is noted that the allowable weight imbalance might be different between different pairs of associated sides.

It is seen that in a bowling tournament where rapid weight measurements must be made that a user of such a device can very rapidly determine whether or not each bowling ball of each individual bowler conformed to the required weight imbalance standards.

The weighing device 1 can further be used to determine where to align and center a finger hole drilling pattern to deliver or achieve a desired weight imbalance of the bowling ball after the finger and thumb holes are dilled. In order to do so, the surface center 99 of the undrilled bowling ball must be ascertained and marked by the aforementioned method. After that occurs, the user places the bowling ball 18 in the cradle 17 and the attachment 141 thereover with the ball surface center 99 in registry with slit intersection point 148. The user then rotates the bowling ball 18 about a generally vertical axis through the surface center such that the reference plane divides the bowling ball 18 into desired halves such as the side-to-side, or the finger to thumb halves. Generally, the drilling pattern of a bowling ball is such that line 85 is generally parallel to lines of lettering (not shown) on the ball surface 75. After this is done, the user of the device then rotates the bowling ball about a horizontal axis extending through the knife edges 29 to a position such that the marker point 59 is in registry with a certain indicia 61 which represents that degree of weight imbalance desired between the two halves opposed to the reference plane.

For example, if the bowling ball 18 were positioned in the cradle 17 in such an orientation that the reference plane bisected the bowling ball into the left and right sides 88 and 89, and the user desires to drill the bowling ball such that the right half 89 of the bowling ball has a certain weight imbalance greater than the left half 88 of the bowling ball, the user would rotate the bowling ball about the horizontal axis in a clockwise direction as shown in FIG. 3 until the marker point 59 registers with that indicia 61 which indicated the degree of weight imbalance desired between the associated halves. At this point the user would draw a line on the bowling ball surface in registry with slit 145 which line lies in the reference plane. The user then rotates the bowling ball about the vertical axis through the geometric center thereof in the cradle 17 to where the reference plane divides the bowling ball into the finger and thumb halves 91 and 93 respectively. At this point, if the user wanted to have the thumb half of the bowling ball weighing more than the finger half of the bowling ball, he would rotate the bowling ball about a horizontal axis parallel with the knife edges 29 an extent to where the marker point 59 indicated on the field 21 that desired degree of imbalance. The user would then mark on the bowling ball surface another line through slit 145 intersecting the first such marked line. The intersection of these two lines would then indicate the center of the drilling pattern 100 for the finger holes and thumb hole which would give the desired weight imbalance.

It is to be understood that while certain embodiments of the present invention have been illustrated and described herein, it is not to be limited to the specific form or arrangment described and shown.

We claim:

1. A method for determining a degree of weight imbalance of a spherical object between each of three sets of hemispheres of the object which are those heimspheres which are opposed to each of three orthogonal planes which intersect at a geometric center of the object, the method comprising the steps of:
    (a) positioning the object into a cradle which is freely and pivotally held between two opposed standards for free rotation over a continuous range of positions about an axis of rotation therebetween with a first rotated position being that position where a center of gravity of said cradle lies in a vertical plane which includes the axis of rotation thereof, said cradle having an indicator thereon which registers with a field positioned on said standard to determine the degree of rotation of said cradle relative to said standard;
    (b) rotating the object within said cradle such that said vertical plane is coincident with one of said orthogonal planes when said cradle is in said first position thereof; said one of said orthogonal planes becoming a comparison plane;
    (c) allowing said cradle to freely rotate relative to said stand;
    (d) measuring the degree of rotation of said cradle relative to said stand;
    (e) comparing the measured degree of rotation with a predetermined schedule to ascertain the weight imbalance between the two halves opposed to the comparison plane; and
    (f) repeating steps (b) through (e) for each of the other two orthogonal planes.

2. A method for determining a reference point on a surface of a spherical object which has a center of gravity thereof spaced from a geometric center thereof, which reference point is on a line extending from a geometric center of the object through the center of gravity of the object and which reference point represents a surface center of said object, said method comprising the steps of:
    (a) positioning the spherical object in a cradle which is freely and rotatably held between two opposed standards for free rotation over a continuous range of rotational positions about an axis of rotation therebetween, with a first rotated position being that position wherein a center of gravity of said cradle lies in a vertical plane through the axis of rotation;
    (b) rotating said object within the cradle about a horizontal axis parallel to said axis of rotation until said cradle is in said first position thereof;
    (c) marking on a surface of said spherical object a first line therealong which line is the intersection of said vertical plane and said ball surface;
    (d) rotating said object within the cradle about a substantially vertical axis passing through the geometric center of the sphere such that said first line is oblique to said vertical plane;
    (e) again rotating said ball within the cradle about a horizontal axis parallel to said axis of rotation until said cradle is in said first position thereof; and
    (f) marking on said spherical surface a second line which is the intersection of said surface and said vertical plane, said second line intersecting said first line at an intersection point, said intersection point being said reference point.

3. A method of aligning a center of a finger and thumb hole drilling pattern on a surface of an undrilled bowling ball have a center of gravity displaced from a geometric center thereof to provide a desired weight imbalance between opposed sides of said ball after finger holes and a thumb hole have been drilled thereinto, said method including the steps of:
    (a) positioning the bowling ball in a circular cradle which is freely and rotatably held between two opposed standards for free rotation over a continuous range of rotational positions about an axis of rotation therebetween, with a first rotated position being that position wherein a center of gravity of said cradle lies in a vertical plane through the axis of rotation;
    (b) rotating said ball within the cradle about a horizontal axis parallel to said axis of rotation until said cradle is in said first position thereof;
    (c) marking on a surface of said spherical object a first line therealong which line is the intersection of said vertical plane and said ball surface;
    (d) rotating said ball within the cradle about a substantially vertical axis passing through the geometric center of the sphere such that said first line is oblique to said vertical plane;

(e) again rotating said ball within the cradle about a horizontal axis parallel to said axis of rotation until said cradle is in said first position thereof;

(f) marking on said spherical surface a second line which is the intersection of said surface and said vertical plane, said second line intersecting said first line at a first point, said first point of intersection being a surface center of said bowling ball comprising that point on the surface of the bowling ball which lies on a line extending from the geometric center of the bowling ball through the center of gravity of the bowling ball;

(g) positioning said bowling in said cradle when said cradle is in the first position thereof such that the first of said lines lies within said vertical plane;

(h) rotating said bowling ball within the cradle about a horizontal axis parallel to the axis of rotation of said cradle until said cradle rotates relative to said standards a degree commensurate with a desired weight imbalance between halves of said ball opposed to said first line;

(i) marking on said bowling ball a third line which lies within said vertical plane;

(j) rotating said bowling ball within the cradle until the second line thereon lies in said vertical plane when said cradle is in the first position thereof;

(k) rotating said ball within the cradle through a horizontal axis parallel with the axis of rotation of said cradle until said cradle rotates a degree commensurate with the desired weight imbalance between halves of said ball opposed to said second line;

(l) marking on said ball surface a fourth line which lies in said vertical plane, said fourth line intersecting said third line at a second point, said second point being the center of drilling pattern for the finger and thumb holes.

4. A method of determining a degree of weight imbalance of a spherical object between each of three sets of hemispheres of the object which are those hemispheres which are opposed to each of three orthogonal planes which intersect at a geometric center of the object to determine whether the degree of weight imbalance between the opposed hemispheres is less than or equal to a maximum acceptable degree of weight imbalance, the method comprising the steps of:

(a) positioning the spherical object into a circular cradle which is freely and pivotally held between two opposed standards for free rotation over a continuous range of positions about an axis of rotation therebetween with a first rotated position being that position where a center of gravity of said cradle lies in a vertical plane which includes the axis of rotation thereof, said cradle having an indicator thereon which registers with a field positioned on said standard to determine the degree of rotation relative to said standard, said field including a zero indicia thereon which is in registry with said indicator when said cradle is in said first position;

(b) positioning a weight on said cradle at a position spaced apart from said cradle axis of rotation and to a side thereof which is adjacent the hemisphere of the bowling ball which weighs less, said weight being commensurate with a maximum degree of acceptable weight imbalance between a hemisphere of said bowling ball opposed to a first reference plane therethrough;

(c) rotate said bowling ball within said cradle to a position where said first reference plane is coincident with said vertical plane;

(d) allowing said cradle to freely rotate about said axis of rotation;

(e) comparing said indicator with said field to determine if said indicator points to said zero indicator or to that half of the bowling ball which weighs less whereby said weight imbalance between said hemispheres opposed to said first reference plane is within the maximum acceptable imbalance, and (f) repeating steps (b) through (e) for each of the other two orthogonal planes.

5. A weighing device to determine weight imbalance in a spherical object comprising:

(a) a support stand having two vertically oriented opposed standards; said standards each having a bore therethrough with an inner surface;

(b) a cradle adapted for supporting a spherical object therein;

(c) said cradle comprising a circular member and including two colinear axles extending outwardly therefrom at opposed positions thereof;

(d) said axles each including thereon a knife edge and being received in an associated standard bore with each of said respective axle knife edges resting on said associated bore inner surface, said cradle being freely rotatable about said knife edges over a continuous range of positions relative to said stand with a first position being such that a vertical reference plane passing through said axis of rotation also passes through a center of gravity of said cradle;

(e) said cradle being substantially symmetrical about a vertical plane including said knife edges;

(f) each half of said cradle opposed to said first position vertical plane having a moment of inertia associated therewith, said moments of inertia being substantially equal;

(g) said cradle including a beveled inner surface thereof having circumferentially spaced roller bearings thereon adapted for engagement with said spherical object when said spherical object is placed therein; and wherein:

(h) said device is adapted such that when said spherical object is placed in said cradle and said cradle is in said first position thereof, a geometric center of said spherical object lies in said vertical plane.

6. A weighing device to determine weight imbalance in a spherical object comprising:

(a) a support stand having two vertically oriented opposed standards;

(b) a cradle adapted for supporting a spherical object therein, said cradle being freely and pivotally supported between said standards at circumferentially opposed points on said cradle for free rotation about an axis therebetween, said cradle rotatable through a continuous range of positions relative to said stand with a first position being such that a vertical reference plane passing through said axis of rotation also passes through a center of gravity of said cradle;

(c) a cross-brace extending between said standards; said cross-brace including thereof an indented portion thereof which is a surface coplanar with said vertical reference plane, said indented portion adapted to allow a user thereof to mark a line on said spherical object which line comprises an intersection of said vertical reference plane and a surface of said bowling ball; and wherein:

(d) said device is adapted such that when said spherical object is placed in said cradle and said cradle is in said first position thereof, a geometric center of said spherical object lies in said vertical plane.

7. A weighing device to determine weight imbalance in a spherical object comprising:

(a) a support stand having two vertically oriented opposed standards;

(b) a cradle adapted for supporting a spherical object therein, said cradle freely and pivotally supported between said standards at circumferentially opposed points on said cradle for free rotation about an axis therebetween, said cradle rotatable through a continuous range of positions relative to said stand with a first position being such that a vertical reference plane passing through said axis of rotation also passes through a center of gravity of said cradle;

(c) said device being adapted such that when said spherical object is placed in said cradle and said cradle is in said first position thereof, a geometric center of said spherical object lies in said vertical plane; and (d) an attachment supported on said cradle, said attachment adapted to be placed over said spherical object, said attachment including:

(1) two intersecting arcuate legs, said legs oriented so as to be perpendicular to each other with one of said legs extending parallel to said vertical reference plane, and (2) each of said legs including therein a slit adapted to allow a user of said device to mark a line in registry with each of said respective slits on a surface of said spherical object, said slit of said one of said legs lying in said vertical reference plane with said slit of the other of said legs lying perpendicular thereto.

8. A weighing device to determine weight imbalance in a spherical object comprising:

(a) a support stand having two vertically oriented opposed standards;

(b) a cradle adapted for supporting a spherical object therein, said cradle freely and pivotally supported by axle shafts between said standards at circumferentially opposed points on said cradle for free rotation about an axis therebetween, said cradle rotatable through a continuous range of positions relative to said stand with a first position being such that a vertical reference plane passing through said axis of rotation also passes through a center of gravity of said cradle;

(c) said device being adapted such that, when said spherical object is placed in said cradle and said cradle is in said first position, a geometric center of said spherical object lies in said vertical plane and said vertical plane dissects said spherical object into opposed hemispheres; and (d) indicator means connected to said cradle and registerable with indicia in a field positioned on one of said standards and adapted to indicate a degree of weight imbalance between said respective spherical object opposed hemispheres; said indicator means including:

(1) a lever arm securely and nonrotatably attached to an end of one of said axle shafts, said lever arm extending generally downwardly from said one axle shaft; and (2) a marker pivotally connected at a medial portion thereof to said one of said standards for free rotation therewith, said marker including at a lower extremity thereof a point which is registerable with said field; and wherein:

(3) a lower portion of said lever arm includes engagement means to pivotally engage an upper portion of said marker such that when said cradle and lever arm are rotated about said cradle axis of rotation in a first direction said marker rotates about said medial portion thereof in a direction opposite to said first direction whereby said marker point is biased toward that side of said bowling ball which weighs more.

9. A weighing device to determine weight imbalance in a spherical object comprising:

(a) a support stand having two vertically oriented opposed standards;

(b) a cradle adapted for supporting a spherical object therein, said cradle freely and pivotally supported between said standards at circumferentially opposed points on said cradle for free rotation about an axis therebetween, said cradle rotatable through a continuous range of positions relative to said stand with a first position being such that a vertical reference plane passing through said axis of rotation also passes through a center of gravity of said cradle;

(c) said device being adapted such that when said spherical object is placed in said cradle and said cradle is in said first position thereof, a geometric center of said spherical object lies in said vertical plane;

(d) a lock mechanism supported on one of said standards communicating with said cradle to lock said cradle in said first position thereof;

(e) a crossbrace extending between said support standards; said crossbrace having an indented portion coplanar with said vertical reference plane; said indented portion adapted to be used as a guide for marking on said spherical object to determine a surface center thereof, whereby said lock mechanism selectively secures said cradle in said first position while said indented portion is used in marking a surface center of said spherical object.

10. The device as set forth in claim 9 wherein:

(a) said lock mechanism includes a pin reciprocable therein which is selectively received within a bore in said cradle when said cradle is in said first position thereof.

11. A weighing device to determine weight imbalance in a spherical object comprising:

(a) a support stand having two vertically oriented opposed standards; and (b) a cradle adapted for supporting a spherical object therein, said cradle freely and pivotally supported between said standards at circumferentially opposed points on said cradle for free rotation about an axis therebetween, said cradle rotatable through a continuous range of positions relative to said stand with a first position being such that a vertical reference plane passing through said axis of rotation also passes through a center of gravity of said cradle, and wherein:

(1) said device is adapted such that when said spherical object is placed in said cradle and said cradle is in said first position thereof, a geometric center of said spherical object lies in said vertical plane; and (2) said cradle comprises a circular member having two axles extending outwardly therefrom at opposed circumferential positions thereof; said cradle including a beveled inner surface thereof having circumferentially spaced roller bearings thereon adapted for engagement with said spherical object when said spherical object is placed therein.

* * * * *